June 18, 1968 R. A. MADLAND 3,388,634
CUSHIONING MEANS FOR FLUID PRESSURE MOTOR
Filed April 8, 1966

INVENTOR.
ROLF A. MADLAND
BY John N. Wolfram
ATTORNEY

United States Patent Office 3,388,634
Patented June 18, 1968

3,388,634
CUSHIONING MEANS FOR FLUID
PRESSURE MOTOR
Rolf A. Madland, Arlington Heights, Ill., assignor to
Parker-Hannifin Corporation, Cleveland, Ohio, a corporation of Ohio
Filed Apr. 8, 1966, Ser. No. 541,281
3 Claims. (Cl. 91—26)

This invention relates to means for cushioning the stopping of the piston in a fluid pressure motor of the cylinder and piston type.

An object of the invention is to provide a cushioning means that is suitable for fluid pressures high enough to preclude the use of elastomeric parts in the cushioning portion of the motor.

Another object is to provide a fluid pressure motor having cushioning means and with a large capacity passage for rapidly admitting fluid to the cushion chamber when the piston is moving out of cushion and wherein a check valve suitable for very high pressures closes the large capacity passage when the piston is moving into cushion.

Other objects of the invention will be apparent from the following description and from the drawings in which.

Figure 1:
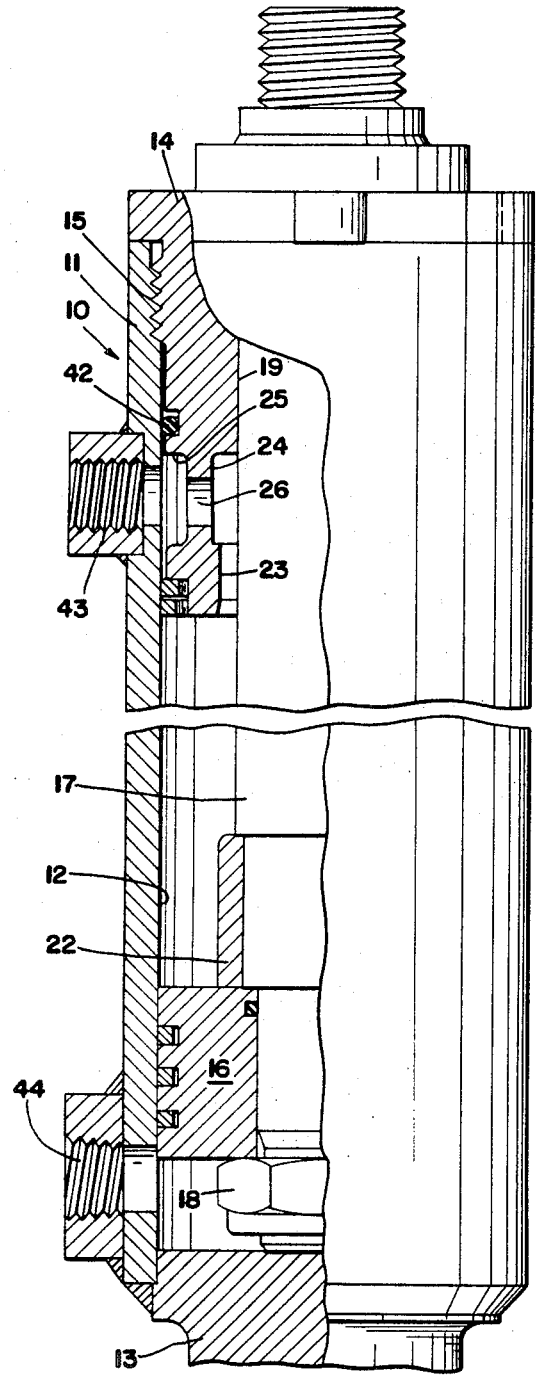
FIG. 1 is a partial section view of a fluid pressure motor.
Figure 2:
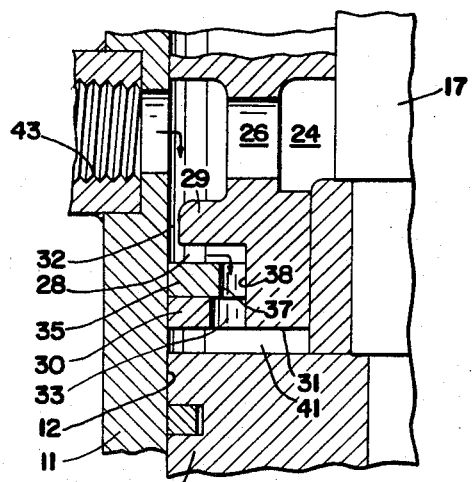
FIG. 2 is a fragmentary section view showing the cushioning parts when the piston is moving out of cushion.
Figure 3:
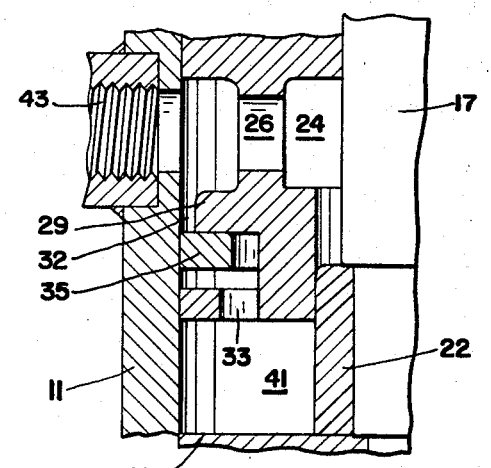
FIG. 3 is a fragmentary section view showing the cushioning parts when the piston is moving into cushion.
Figure 4:
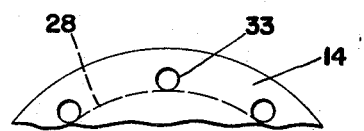
FIG. 4 is a fragmentary end view of the cylinder closure member.

The motor 10 comprises a cylinder body 11 having a cylindrical bore 12 closed at one end by a member 13 welded to the body and at the other end by a member 14 that is threaded onto the body as at 15.

A piston 16 is slidably mounted within bore 12 and has a rod 17 attached thereto by means of a nut 18. Rod 17 extends through a close fitting bore 19 in closure member 14. Adjacent piston 16 rod 17 carries a cushion sleeve 22 that has a close sliding fit with counterbore 23 in closure member 14 that connects with an annular recess 24 in the latter. Recess 24 communicates with an annular groove 25 by means of a series of radially extending openings 26.

At its inner end, closure member 14 has an annular groove 28 formed between flanges 29 and 30. The periphery of flange 30 has a close clearance of only a few thousandths of an inch with cylinder bore wall 12 while flange 29 has a much larger clearance 32 that serves as an annular passage of relatively large capacity, as described below. The bottom of groove 28 is connected to the interior of the cylinder body by a circular row of drilled openings 33. Slidably mounted within groove 28 is an annular check valve ring 35 whose outer peripheral surface has a close sliding fit with the wall of bore 12 so as to prevent any significant leakage of fluid therebetween while the radially inner surface 37 of the ring is spaced from the bottom wall 38 of groove 28 so as to at all times permit full communication of openings 33 with the bottom portion of groove 28.

A packing 42 seals closure member 14 relative to cylinder body 11 and the latter has port openings 43 and 44 formed therein to permit the admitting and exhausting of motive fluid from opposite sides of piston 16.

In operation and with piston 16 at the lower end of its stroke as shown in FIG. 1, fluid under pressure is admitted through port 44 to the bottom side of piston 16 and forces the same upwardly. During such upward movement, fluid from the upper side of piston 16 is expelled through counter bore 23, recess 24, openings 26 and groove 25 through port 43. At the same time, fluid enters groove 28 via openings 33 and moves check valve ring 35 upwardly against flange 29 to close off passage 32.

As piston 16 nears the upper end of its stroke, cushion sleeve 22 enters counter bore 23 to substantially cut off passage of fluid therethrough and thus forming a substantially closed cushioning chamber 41 between the upper side of piston 16 and the lower end 31 of closure member 14 in which fluid is trapped, there being only a very restricted flow of the trapped fluid through the small clearance between cushion sleeve 22 and counter bore 23. As the piston continues to rise, the pressure of the trapped fluid increases rapidly and cushions the stopping of the piston.

When the piston is to be moved in the opposite direction, fluid under pressure is introduced through port 43 and passes through groove 25, openings 26 and recess 24 to act downwardly on the upper end of cushion sleeve 22. Because the area of the latter is relatively small, the total force of the fluid within recess 24 acting to move the piston downward is not very great. However, at this time fluid from port 43 also enters annular passage 32 and moves check valve ring 35 downward against flange 30 to permit the fluid to enter groove 28 and pass from the bottom portion thereof through openings 33 into cushion chamber 41 and exert downward pressure upon piston 16 for quickly moving the latter to an out-of-cushion position in which cushion sleeve 22 is withdrawn from counter bore 23. Thereafter, fluid from port 43 freely enters the cylinder through counter bore 23 to continue to move the piston downwardly.

The force with which piston 16 is moved upwardly by fluid pressure entering port 44 is the product of the fluid unit pressure and the area circumscribed by the outer diameter of piston 16. When the piston has been moved upwardly so that cushion sleeve 22 enters counter bore 23 to trap fluid in the cushion chamber, the fluid pressure within such chamber rises to a much higher value than the pressure on the lower side of the piston because of the smaller area on the upper side of the piston against which the trapped fluid reacts. Thus, for a cylinder in which an operating pressure of 1500 p.s.i. is admitted to port 44, the pressure of the trapped fluid in the cushion chamber may momentarily reach pressures of 12,000 to 15,000 p.s.i. This pressure is exerted against check valve ring 35 and in such instances elastomeric materials are entirely unsuited for check valve ring 35 and the latter must be of metal or hard plastic in order to close off passage 32 without being extruded into the same.

Although only one form of the invention has been illustrated and described, it is obvious that many modifications may be made therein within the scope of the invention as claimed.

I claim:

1. In a fluid pressure motor, a cylinder having a bore therein, a piston reciprocable within the bore, cooperating means on the piston and cylinder forming a cushioning chamber when the piston nears one end of the cylinder, a port in the cylinder for admitting and exhausting fluid to and from said cylinder, an annular passage defined in part by the wall of the cylinder bore and connecting the port to the cushioning chamber, a ring-shaped check valve in said annular passage axially movable by fluid pressure in one direction for closing the passage and in another direction for opening the passage, the outer diameter of the check valve ring having a close sliding fit with said bore wall so as to substantially prevent flow of fluid therebetween.

2. In a fluid pressure motor, a cylinder having a bore therein, a piston reciprocable within the bore, cooperating means on the piston and cylinder forming a cushioning chamber when the piston nears one end of the cylinder, a port in the cylinder for admitting and exhausting fluid to and from said cylinder, said cooperating means including a member that has an annular groove opening toward the wall of said bore, an axial duct conecting the radially inner portion of the groove with the chamber, one end wall of the groove being spaced from the bore wall to provide an annular passage between the member and the bore wall connecting the groove with the port, a check valve ring within the groove and extending through said opening and beyond said end wall into sliding contact with said bore wall and movable axially within said groove by fluid pressure to open and close said passage.

3. The motor of claim 2 in which said passage is in the form of a clearance between said member and the wall of said bore, and said check valve ring has a clearance with an annular bottom wall of said groove for connecting said duct with said clearance, said duct connecting with the groove at a location between said bottom wall and the inner diameter of said check valve ring.

References Cited
UNITED STATES PATENTS 2,960,068  11/1960  Becker _____ 91—394
3,267,815  8/1966  Ortman et al. _____ 92—85

MARTIN P. SCHWADRON, *Primary Examiner.*

P. T. COBRIN, B. L. ADAMS, *Assistant Examiner.*